United States Patent
Yang et al.

(10) Patent No.: US 8,967,391 B2
(45) Date of Patent: Mar. 3, 2015

(54) METHOD FOR PREPARING COMPOSITE MULTILAYER POROUS HOLLOW MEMBRANE AND DEVICE AND PRODUCT THEREOF

(75) Inventors: Xinhao Yang, Guangzhou (CN); Hailin Ge, Guangzhou (CN)

(73) Assignee: Memstar (Guangzhou) Co., Ltd, Guangzhou, Guangdong (CN)

( * ) Notice: Subject to any disclaimer, the term of this patent is extended or adjusted under 35 U.S.C. 154(b) by 667 days.

(21) Appl. No.: 13/377,825

(22) PCT Filed: Dec. 7, 2010

(86) PCT No.: PCT/CN2010/079531
§ 371 (c)(1),
(2), (4) Date: Dec. 13, 2011

(87) PCT Pub. No.: WO2011/069441
PCT Pub. Date: Jun. 16, 2011

(65) Prior Publication Data
US 2012/0085698 A1    Apr. 12, 2012

(30) Foreign Application Priority Data
Dec. 7, 2009  (CN) .......................... 2009 1 0213612

(51) Int. Cl.
*B01D 69/08*   (2006.01)
*B01D 63/02*   (2006.01)
(52) U.S. Cl.
CPC .............. *B01D 69/08* (2013.01); *B01D 69/087* (2013.01)
USPC ................. 210/500.23; 210/500.22

(58) Field of Classification Search
None
See application file for complete search history.

(56) References Cited

U.S. PATENT DOCUMENTS

| | | | |
|---|---|---|---|
| 5,395,570 A * | 3/1995 | Kopp et al. | 264/41 |
| 2005/0058821 A1* | 3/2005 | Smith et al. | 428/304.4 |
| 2006/0121217 A1* | 6/2006 | Childs et al. | 428/34.1 |
| 2009/0178969 A1* | 7/2009 | Hanakawa et al. | 210/321.6 |
| 2009/0283469 A1* | 11/2009 | Ariji et al. | 210/500.23 |
| 2009/0297822 A1* | 12/2009 | Fujimura et al. | 428/314.2 |
| 2010/0221522 A1* | 9/2010 | Mrozinski | 428/315.5 |
| 2011/0226689 A1* | 9/2011 | Komori et al. | 210/490 |
| 2011/0297612 A1* | 12/2011 | Hester et al. | 210/500.21 |

* cited by examiner

Primary Examiner — Krishnan S Menon
(74) Attorney, Agent, or Firm — George Dacai Liu

(57) ABSTRACT

A method for preparing a composite multilayer porous hollow fiber membrane and the device and product thereof. The method comprises preparing uncured porous hollow fibers with larger pore diameters as the inner supporter of the membrane from thermoplastic macromolecule polymer resins by thermal induced phase separation method and then bonding a superthin coating layer with microfiltration or nanofiltration function and small pore diameter prepared on the outer surface of the hollow fibers from a solution of the thermoplastic macromolecule polymer resins by a coating process using non-solvent induced phase separation method. The composite multilayer porous hollow fiber membrane has such excellent mechanical strength and high water flux as the membranes prepared by thermal induced phase separation method, such high precision filter effect and high contamination resistance as the membranes prepared by non-solvent induced phase separation method, and high binding force of the membrane prepared by the above method.

7 Claims, 5 Drawing Sheets

METHOD FOR PREPARING COMPOSITE MULTILAYER POROUS HOLLOW MEMBRANE AND DEVICE AND PRODUCT THEREOF

FIELD OF THE INVENTION

The present invention relates to a method for fabricating filter membranes, and devices and products. Particularly, it is a method for fabricating composite multilayer porous hollow fiber filter membrane and devices and products. More particularly, it relates to a method for fabricating composite multilayer porous hollow fiber filter membranes for water treatment and devices and products.

BACKGROUND OF THE INVENTION

Currently, ultrafiltration (UF), microfiltration (MF) separation membranes have been widely used in food industry, medical fields, domestic and municipal water usage, and industrial and municipal waste water treatments and the like. Presently, there is a severe shortage of water resources around the world. Great promotion of water savings and waste water discharge reduction, treatment of industrial waste water and municipal waste water, and further in-depth treatment are to achieve the objective of re-use of neutral water, so as to realize the overall goal of "zero emission".

In recent years, the filtration method of porous hollow fiber membranes has gradually been used widely, mainly in treatment of industrial and municipal waste water and further treatment so as to achieve the re-use of neutral water. This method treats water in large quantity, and has the safe characteristics of water treatment, large effective membrane surface areas per unit volume, and small device space. This method requires that the porous hollow fiber membranes used have high porosity and narrow pore size distribution to improve separation efficiency and separation accuracy. Moreover, it also requires that the membranes possess the pore sizes most suitable for separation targets, and the characteristics of effectively excluding bacteria, suspension solids, and turbid components. Meanwhile, the membrane fibers of the membranes shall have higher mechanical strength and high water flux so that they can be long-term used under the conditions of chemically cleaning of polluted membranes and operations under high operational pressures.

China patents (CN9511749T and CN98103153) disclose an earlier method for producing polyvinylidene fluoride (PVDF) hollow fiber membrane by non-solvent induced phase separation (NIPS) technique. Thermoplastic macromolecule polymer resins, good organic solvents and pore forming agents in a ratio are mixed; after homogeneously dissolved, being extruded through a spinning nozzle into the coagulation bath comprising solvents; the good solvents and pore forming agents in the polymer solution are extracted into the coagulated phase, and the polymers are due to phase transfer so as to precipitate and form polymeric hollow fiber membranes. However, in this kind of solvent phase transfer, it is difficult to cause evenly phase separation along the membrane thickness direction, resulting in the formation of an asymmetric membrane that contains a dense surface layer and a supporting layer with finger-like and sponge-like macrovoids. Hence, the membrane has poor mechanical strength owing to isotropic and non-oriented molecules. Furthermore, the exchange of solvents in the process causes a portion of solvents to participate in polymeric gelation, resulting in lower porosity.

In order to solve the problem of the poor mechanical strength of the hollow fiber membranes made by the non-solvent induced phase separation (NIPS) technique, the woven braid made of macromolecule polymers with excellently high mechanic strength or tubular braid is used as the supporting structure for separation membranes, and the embedding technique or coating technique is used to produce hollow fiber membrane or tubular membrane with strengthened supporting structure. Hayano et al. (U.S. Pat. No. 4,061,821) disclose a membrane with a completely embedded tubular braid; the membrane has a larger thickness so as to increase fluid flowing resistance and then remarkably reduce water permeability. U.S. Pat. No. 5,472,607 describes the use of thin films and current flat sheet membrane coating techniques to produce a composite hollow fiber membrane having a layer of functional separation thin film being coated onto the surfaces of the reinforced material or supporting material made of tubular braids. Even though it solves the problem of the increased fluid flowing resistance in the embedding approach, no matter of the embedding approach or coating technique causes the separation of separation membrane and supporting material during usage because membrane-producing material especially thermoplastic macromolecule polymer resins such as polyvinylidene fluoride (PVDF) has different physical properties from other macromolecule polymer braid materials, resulting in weak binding force between them. For example, under higher temperature, polyacrylnitrile supporting material will contract and cause peeling. The physical properties of woven or knitted braids of polyethylene (PE), or Polyethylene terephthalate (PET), or nylon are different from polyvinylidene fluoride (PVDF), making peeling more easily when being long-term used under pH>10 condition. In addition, the non-solvent induced phase separation (NIPS) technique depends on many parameters, affecting membrane structures and properties. Thus, the operation procedure of membrane production is hard to control, and lacks of reproducibility.

To overcome above-mentioned shortcomings, other membrane production methods have been explored. It was tried to use the thermal induced phase separation (TIPS) technique using heat to induce phase separation. For example, polyvinylidene fluoride with excellent crystallization property simultaneously crystallizes and forms membrane during phase separation in the phase separation process. Australia patent No 653528 discloses an earlier method for making a hollow fiber membrane using the thermal induced phase separation (TIPS) technique. In the disclosed method, polyvinylidene fluoride resin and organic pore-forming agents are mixed and heated under partial vacuum at 220° C. to form a melted polymeric dope; then the polymeric dope is extruded through a spinning nozzle to form a hollow fiber membrane at 215° C.; such a hollow fiber membrane has low porosity. U.S. Pat. No. 5,022,990 discloses another improved method: adding inorganic pore-forming particles into organic pore-forming agents, mixing with polyvinylidene fluoride resin, then melting the mixture and extruding to obtain a hollow fiber-like, or tube-like, or flat-like membrane, and finally extracting to remove the organic pore-forming agents and inorganic pore-forming particles; the resultant membrane has an inner diameter of 1.10 mm, wall thickness of 0.45 mm, mean pore size of 0.05-5 μm, and tensile strength of 7-20 MPa. The shortcoming of this technique is that as the inner diameter of the membrane increases, the wall becomes thinner, reducing pressure resistance and water flux. In order to improve the shortcomings present in membrane production techniques, Japan patent JP3-215535 discloses a method for producing a polyvinylidene fluoride (PVDF) hollow fiber membrane with higher mechanical strength and pressure resistance. polyvinylidene fluoride resin is mixed with organic pore-forming agents such as dioctyl phthalate (DOP) and inorganic pore-forming particle like hydrophobic silicon dioxide nano particles. At the temperature of 250° C., melting and extruding to form a solidified produce, and extracting the organic and inorganic pore-forming agents/particles to obtain a homogeneous pore size symmetric membrane without skins on the surfaces of inner and outer layers; such a membrane has lower filtration accuracy and porosity. Since the outer layer of the membrane produced by the thermal induced phase separation (TIPS) technique is rougher than that of membrane by the non-solvent induced phase separation (NIPS) technique, it tends to reduce the membrane resistance to contamination.

SUMMARY OF THE INVENTION

To overcome these technical deficiencies, an object of the present invention is to provide a method of producing a composite multilayer porous hollow fiber membrane so as to increase the mechanical strength, water flux, filtration accuracy and contamination resistance of the membrane, and also to avoid the possibility of peeling between multilayers.

To achieve the above objects, the present invention in-depth studied the combination of the thermal induced phase separation (TIPS) technique and non-solvent induced phase separation (NIPS) technique and developed new stable production technology for fabricating a composite multilayer porous hollow fiber membrane with high mechanical strength, high filtration accuracy, high binding force between multilayers, high contamination resistance and high water flux. The embodiments are as follows.

One embodiment of the method for fabricating a composite multilayer porous hollow fiber membrane of the present invention comprises the following steps:

(1) mixing thermoplastic macromolecule polymer resin, organic pore-forming agent, inorganic pore-forming agents and auxiliary agent in the ratio by weight of 30-50:20-40:10-30:0-5, extruding melted and kneaded mixture through an extruder, obtaining an uncured hollow fiber;

(2) mixing said thermoplastic polymeric resin, hydrophilic macromolecule pore-forming agent, surfactant, good solvent and poor solvent in the ratio by weight of 5-30:1-20:1-20:40-90:1-10 in a coating solution tank, to be used as a coating liquid dope;

(3) passing the uncured hollow fiber obtained in said step (1) into the coating liquid tank of non-solvent induced phase separation technique of said step (2) after walking 0-5 cm; while the uncured hollow fiber obtained in said step (1) is cured, the coating solution dope of said step (2) is simultaneously being coated on its surface, resulting in a hollow fiber-like with an ultra thin outer layer;

(4) passing the hollow fiber with an ultra thin outer layer obtained in said step (3) through a sealing spinning nozzle of the coating device, and introducing it into a coagulation bath for coagulating the coating layer to form a composite multilayer hollow fiber;

(5) extracting to obtain the composite multilayer hollow fiber membrane. In the present invention, the thermoplastic macromolecule polymer of said step (1) and step (2) refers to the thermoplastic macromolecule polymer resins that are suitable for both thermal induced phase separation (TIPS) technique and non-solvent induced phase separation (NIPS) technique, including PVDF homopolymers or copolymers, such as poly(vinylidene fluoride-hexafluoropropylene), poly (vinylidene fluoride-chlorotrifluoroethylene), poly(vinylidene fluoride-ethylene), etc., polysulfone, polyether sulfone, ethylene-vinyl alcohol copolymers etc. Preferably, the the PVDF homopolymers or copolymers with excellent chemical resistance are used; most preferably PVDF homopolymer.

The supporting inner layer of the composite multilayer porous hollow fiber membrane fabricated by the thermal induced phase separation (TIPS) technique of the present invention is made with the following ratio by weight,

| Polyvinylidene fluoride (PVDF) | 20-60; |
|---|---|
| Organic pore-forming agents | 10-60; |
| Inorganic pore-forming agents | 1-40. |

In the above formula, a suitable amount of auxiliary agents can be added as needed, such as one or more of antioxidants, lubricants, anti-adhesion agents, thermal stabilizers and UV absorbers, etc., in the range of 0-5% in the total weight.

The organic pore-forming agents of said step (1) include phthalates such as dimethyl phthalate (DMP), diethyl phthalate (DEP), dibutyl phthalate (DBP), dioctyl phthalate (DOP), etc., γ-butyrolactone, benzoates, sebacates, adipates, trimellitic esters or phosphates, etc.; one or a mixture of the organic pore-forming agents can be used.

The inorganic pore-forming agents (surface areas: 30-150 $m^2/g$, average particle diameters: <100 nm) of said step (1) are at least one of activated nano oxides and activated organic clays, including activated nano zinc oxide, activated nano calcium carbonate, and activated nano silicon dioxide, etc., or activated organic clays, activated nano diatomite, and activated nano kaolinite (the "activated" refers to the surface of inorganic pore-forming agents being subject to organic hydrophobic treatment, making said agents to be able to finely disperse in an organic system). The inorganic pore-forming agents can be natural or synthetic, and used individually or in combination. In the present invention, it is preferably to use activated nano zinc oxide and activated nano calcium carbonate with good dispersion and easy post-treatment.

As the inner layer supporting the hollow fiber membrane, the amount of polyvinylidene fluoride (PVDF) is mainly to provide sufficient mechanical strength; the total amount of organic pore-forming agents shall be the more, the better. When the amount of PVDF is not changed, the more the amount of organic pore-forming agents is, the easier the sufficient larger pores can be formed in the inner layer, increasing the membrane porosity, and at the same time being able to reduce the resistance during water filtration and save operating energy. As long as sufficient mechanic strength of the membrane is ensured, inorganic pore-forming agents endow the newly formed pores within the membrane with three dimensional structures; the amount of inorganic pore-forming agents is the more, the better; but if too much, the materials for membrane production have increased viscosity, making it difficult for fabricating membrane. To control the pore size of inner layer surface in the range of 0.1-10 μm in light of the above-discussed considerations, one preferable ratio by weight is as follows:

| polyvinylidene fluoride (PVDF) | 30-50; |
|---|---|
| Organic pore-forming | 20-40; |
| Inorganic pore-forming agents | 10-30. |

In the present invention, the ultra-/micro-filtration coating layer with a surface with accurate filtration fabricated by non-solvent induced phase separation (NIPS) technique is made of components with a ratio by weight as follows:

| | |
|---|---|
| Thermoplastic macromolecule polymer resins | 5-30; |
| Hydrophilic macromolecule polymer pore-forming agents | 1-20; |
| Surfactants | 1-20; |
| Good solvents | 40-90; |
| Poor solvents | 1-10. | where the thermoplastic macromolecule polymer resins are preferably PVDF resin.

In the above formula, the macromolecule pore-forming agents are hydrophilic soluble macromolecules, soluble in coagulation solutions or post-treatment solutions. The hydrophilic macromolecule pore forming agents include polyvinyl pyrrolidone (PVP), polyethylene glycol (PEG), methyl cellulose, caboxy methyl cellulose, polyvinyl alcohol, polyacrylic acid, polyacrylate and its esters, etc.; they can be used alone or in combination.

The surfactants include anionic surfactants, cationic surfactants, amphoteric surfactants or non-ionic surfactants, specifically such as Tween-80, sodium dodecyl sulfate, sodium dodecylbenzene sulfonate, dodecyl benzyl ammonium chloride, cetyl trimethyl ammonium bromide, etc.; they can be used alone or in combination.

The good solvents include dimethylformamide (DMF), dimethylacetamide (DMAc), N-methyl pyrrolidone (NMP), dimethylsulfoxide (DMSO), methyl ethyl ketone, acetone, γ-butyrolactone etc.; they can be used alone or in combination of any two of them.

The poor solvents, or alternatively called non-solvents, include low molecular weight polyols such as glycerin, ethylene glycol, butanediol and propylene glycol, low molecular weight alcohols such as methanol, ethanol, butanol and isopropanol, etc., or water; they can be used alone or in combination of any two of them.

In general, the coating layer has filtration functions with accurate microfiltration/ultrafiltration, hydrophilicity and anti-contamination. As long as the coating layer can completely cover the surface of the inner supporting layer as support in a hollow fiber membrane, the thickness of the coating layer is the thinner, the better. Since, during the coating process, the PVDF in the inner supporting layer and the PVDF in the coating layer are the same thermoplastic macromolecule polymer resin material, and moreover the coating is being done prior to the newly produced inner supporting layer being cured, these two layers can be well integrated together. The thickness of the coating layer can be controlled within the range of 0.01-0.5 mm, and the pore size of filtration surface of the coating layer within the 0.01-0.5 μm. The PVDF amount is able to cover the whole surface of the inner supporting layer of a composite multilayer porous hollow fiber membrane. If the amount of the PVDF is too much, the viscosity of the coating liquid dope is high, the thickness increases, the membrane porosity is lowered, the resistance of water permeation is increased. If the amount of the PVDF is too little, the coating polymeric dope solution is too diluted to perform even coating, failing to function as an accurate filtration layer. The added amount of the hydrophilic polymeric pore-forming agents depends on the stability of the coating polymeric dope solution, not causing emulsification or phase separation; and the coating layer made from the homogeneously dispersed and stable coating polymeric dope solution has higher porosity. In making a coating polymeric dope solution, the surfactants offset the deficiency of the macromolecule pore-forming agents; their permeability and emulsification can enhance the stability of coating liquid dope. The poor solvents can promote the micro-phase separation of the coating polymeric dope solution and facilitate to obtain the coating layer with larger pore sizes, but over-addition can result in deteriorating the stability of coating polymeric dope solution. The amount of good solvents can coordinate the viscosity and stability of coating polymeric dope solution. In consideration of all above factors, the preferred ratio by weight is as follows:

| | |
|---|---|
| Thermoplastic macromolecule polymer resins | 5-15; |
| Hydrophilic macromolecule polymer pore-forming agents | 5-15; |
| Surfactants | 1-10; |
| Good solvents | 60-85; |
| Poor solvents | 1-10. | where the thermoplastic macromolecule polymer resins are preferably PVDF resin.

The walking distance from the uncured hollow fiber made by the thermal induced phase separation (TIPS) technique entering the coating equipment of the non-solvent induced phase separation (NIPS) technique can be 0-5 cm. Since the coating is entailed to be done on the surface of the uncured hollow fiber and securely integrated together, the shorter the distance between them, the better. Preferably, the distance is about 0-0.5 cm. When the distance is over 2 cm, the interface between two phases could be observed under the scanning electron microscope; therefore, the peeling strength may be weakened.

The thickness of the coating layer can be controlled by the moving rate of the uncured hollow fiber made by the thermal induced phase separation (TIPS) technique entering the coating equipment of the non-solvent induced phase separation (NIPS) technique. The thickness of the coating layer can be in the range of 0.01-0.5 mm, preferably 0.015-0.2 mm.

In the present invention, the coated composite multilayer PVDF hollow fiber enters a coagulation bath where the coating layer is coagulated. Coagulation solutions can be non solvents for PVDF resin such as one or two of methanol, ethanol and other alcohols, glycerin, ethylene glycol and other low molecular weight polyols and water. To the non solvents can be added a certain amount of good solvents such as dimethylformamide (DMF), dimethylacetamide (DMAc), N-methyl pyrrolidone (NMP), dimethylsulfoxide (DMSO), methyl ethyl ketone, acetone, γ-butyrolactone etc., tetrahydrofuran etc., so as to control the membrane-forming structures of the outer layer such as finger-like and sponge-like structures. When water is used as a coagulation solution, dimethylacetamide (DMAc) as a good solvent for PVDF resin can be added within the range by weight of 10-80% to achieve that the outer layer is not squashed or has too high filtration resistance. To reduce or completely eliminate the finger-like structure, the content of dimethylacetamide (DMAc) as a good solvent in a water-based coagulation solution is preferably 20-60% by weight.

In the present invention, the organic pore-forming agents and solvents in the formed composite multilayer hollow fiber membrane can be extracted by polar solvents; extraction temperature of 20-80° C., primarily ensure the thermoplastic polymeric resins not being dissolved or denatured, and the polar solvents are volatile, easy to be removed from the hollow fiber membrane after extraction. The polar solvents with low boiling points include methanol, ethanol, 2-propanol and other alcohols, dichloromethane, dichloroethane and other chlorinated hydrocarbons. Preferable polar solvents are environmentally friendly alcohols.

In the present invention, the inorganic pore-forming agents in the formed composite multilayer hollow fiber membrane, based on their different properties, can use different solutions. For example, alkaline oxides can use acidic solutions such as hydrochloric acid, sulfuric acid, phosphoric acid etc; and acidic oxides can use alkaline solutions such as sodium hydroxide, potassium hydroxide, calcium hydroxide. In the present invention, alkaline oxides can be preferably used as inorganic pore-forming agents, thereby acidic solutions with pH>1 is preferable.

In the present invention, while necessary, a composite multilayer hollow fiber membrane can be drawn either prior to or post extracting and abstracting to enhance its mechanical strength and water flux. Drawing rate is in the range of 10-100%, preferably in the range of 20-50%.

In the present invention, a composite multilayer porous hollow fiber membrane after extracting and abstracting, is washed with pure water, soaked in the 50% glycerin solution, and finally dried in the thermal atmosphere with temperature of 20-80° C.

The second object of the present invention is to provide a composite multilayer porous hollow fiber membrane produced by the above-mentioned methods; the membrane comprises an inner supporting layer and an outer surface layer. The inner supporting layer has a sturdy structure with large pore sizes; the pore sizes of the inner surface are in the range of 0.1-10 μm; the outer surface layer has an ultra fine pore size structure; the pore sizes of the outer surfaces are in the range of 0.01-1 μm; the porosity of 50-90%; the pure water permeation rate with the range of 500-5000 L/m2 hr@0.1M Pa, 25° C.; the tensile break strength with the range of 8-25 MPa; the tensile break elongation with the range of 100-250%; the anti-compressive strength with the range of 0.8-2.0 MPa; the outer diameter with the range of 0.5-3.0 mm; the wall thickness with the range of 0.1-1.0 mm. There is no clear phase-separation interface in the radial cross section of the composite multilayer hollow fiber membrane. Moreover, the density of sponge-like structure is increased with the gradient from the internal membrane to the membrane surface. Thereby, during tensile and peeling tests, there is no observation of peeling-off between the two layers, instead, the membrane fracture is observed. In the present invention, after the composite multilayer hollow fiber membrane is soaked in a 2% sodium hydroxide solution for a consecutive month at room temperature, there is no observation of peeling-off between the two layers, and its tensile break elongation is maintained to be >95%.

The third object of the present invention is to provide an apparatus used for the above mentioned method of producing a composite multilayer porous hollow fiber membrane. The apparatus includes an extruder, a melt pump, a fiber spinning mold, an adjustable fixed part, a device of coating polymeric dope solution, a coating polymeric dope solution tank, a pump for delivering the coating polymeric dope solution, a coagulation bath and a reeling wheel. The extruder, melt pump and fiber spinning mold are connected in sequence; the fiber spinning mold and device of coating polymeric dope solution are connected by the adjustable fixed part; the coating polymeric dope solution tank and device of coating polymeric dope solution are connected by the pump for delivering coating polymeric dope solution; the device of coating polymeric dope solution sequentially connects with the coagulation bath and the reeling wheel.

Compared with the existing technologies, the present innovation has the following beneficial effects:

(1) Active nano alkaline oxides such as active nano zenic oxide, active nano calcium carbonate etc. are used as inorganic pore-forming agents in producing the inner supporting layer by the thermal induced phase separation (TIPS) technique in the present invention; they can be easily and quickly abstracted from the composite multilayer hollow fiber to form porous membranes at room temperature by using strong acidic solutions. It avoids the color change of PVDF resin material, membrane surface aging and deterioration in strong alkaline solutions.

(2) The one-step process combining the thermal induced phase separation (TIPS) technique with the non-solvent induced phase separation (NIPS) technique for producing a composite multilayer porous hollow fiber membrane solves not only the peeling problem between a coated PVDF hollow fiber membrane made by the NIPS technique and an inner supporting layer of other polymeric materials due to the poor adhesion between PVDF material and other polymeric materials, but also the problem of the low mechanical strength of an ordinary PVDF hollow fiber membrane without an inner supporting layer of other polymeric materials, directly made by the NIPS technique. In particular, it shields the composite multilayer porous hollow fiber membrane from the decrease of the mechanical strength and elongation and the resultant membrane fragility caused by exposing the membrane in the high concentration alkaline solutions with pH>10. It makes the application range of the composite multilayer porous hollow fiber membrane not be confined by the mentioned shortages.

(3) The surface of the outer layer with accurate filtration function, coated by the NIPS technique, contains, hydrophilic surfactants, greatly improving the capability of anti-pollution on the surface of a composite multilayer porous hollow fiber membrane, especially the capability of strong anti-organic pollution in the treatment of industrial waste water.

In the present invention, the composite multilayer porous hollow fiber membrane has both the high mechanical strength and high water permeation of a membrane made by the TIPS technique and the accurate filtration function and anti-pollution capability of a membrane made by the NIPS technique. There is no clear interface between layers. In applications there is no peeling-off phenomenon between layers. Since the large pore sizes in the inner supporting layer greatly reduce the fluid resistance and saves energy and the ultra fine pore sizes in the outer coating layer maintain the filtration accuracy, the composite multilayer porous hollow fiber membrane has highly effective porosities; it can be widely applied in various filtration areas.

BRIEF DESCRIPTION OF THE DRAWINGS

Preferred embodiments according to the present invention will now be described with reference to the Figures, in which like reference numbers denote like elements.

DETAILED DESCRIPTION OF THE INVENTION

The following embodiments are provided for the sole purpose of easily understanding the present invention and further illustrating the principles of the present invention. It by no means limits the scope of the present invention. The following embodiments have used common experimental conditions even though there are no detailed experimental conditions mentioned in them.

Embodiment 1

Figure 1:
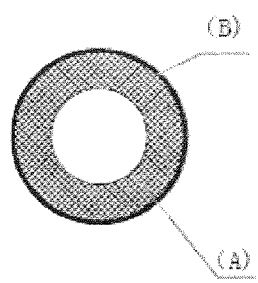
FIG. 1 shows an exemplary cross-sectional schematic diagram of a composite multilayer porous hollow fiber membrane in accordance with one embodiment of the present invention.

An exemplary cross-sectional schematic diagram of a composite multilayer porous hollow fiber membrane in accordance with one embodiment of the present invention is shown in FIG. 1. As shown in FIG. 1, the composite multilayer porous hollow fiber membrane comprises an inner supporting layer A and an ultra thin coating layer B, where the inner supporting main body layer A is produced by the thermal induced phase separation (TIPS) technique from a thermoplastic polymeric resin into a hollow fiber membrane, and a thermoplastic polymeric resin dope solution comprising the same thermoplastic polymeric resin as used in producing the supporting layer A is coated on the surface of the supporting layer A by the non-solvent induced phase separation (NIPS) technique to form an ultra thin coating layer B with small pore sizes and accurate filtration function.

Embodiment 2

Figure 2:
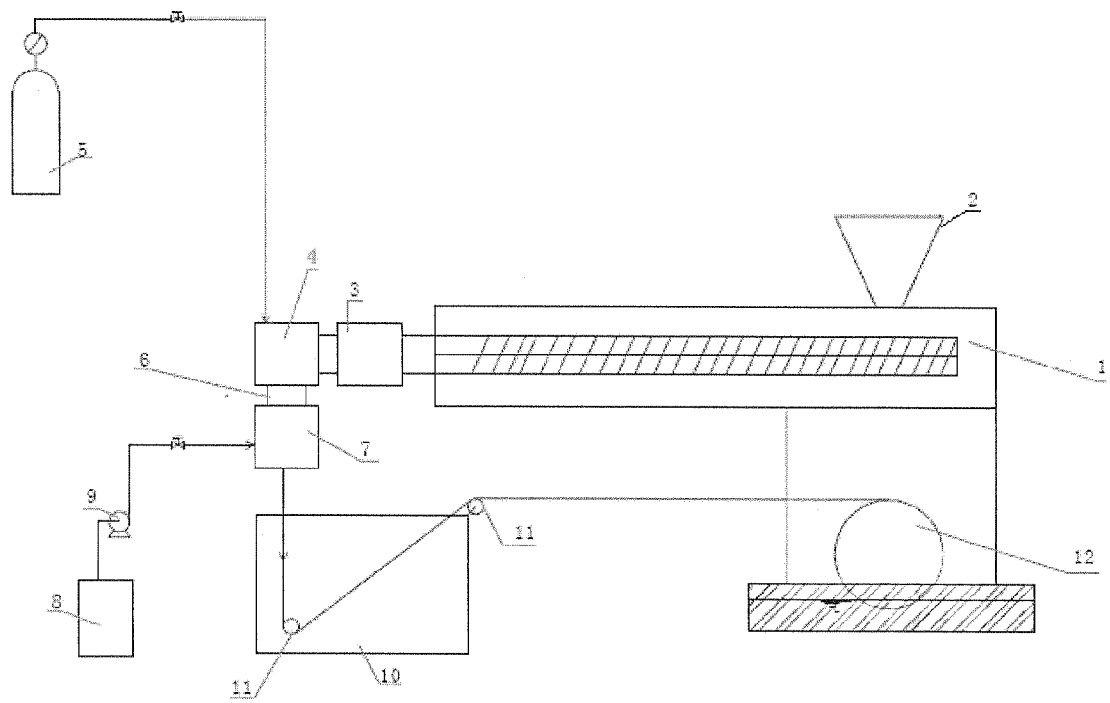
FIG. 2 is a functional block diagram of the apparatus for producing a composite multilayer porous hollow fiber membrane in accordance with one embodiment of the present invention.

FIG. 2 is a functional block diagram of the apparatus employed for producing a composite multilayer porous hollow fiber membrane of the present invention. The apparatus realizes a technique process of the present invention for producing a composite multilayer porous hollow fiber membrane by combining the thermal induced phase separation (TIPS) technique and the non-solvent induced phase separation (NIPS) technique. As shown in FIG. 2, the apparatus comprises an extruder 1, a melt pump 3, a fiber spinning mold 4, an adjustable fixed part 6, a coating polymeric dope solution coating device 7, a coating polymeric dope solution tank 8, a coating polymeric dope solution delivering pump 9, a coagulation bath 10, and a reeling wheel 12. The extruder 1, melt pump 3 and fiber spinning mold 4 are connected in order. The fiber spinning mold 4 and coating polymeric dope solution coating device 7 are connected by the adjustable fixed part 6. The coating polymeric dope solution tank 8 and coating polymeric dope solution coating device 7 are connected by the coating polymeric dope solution delivering pump 9 for delivering the coating polymeric dope solution. The coating polymeric dope solution coating device 7, coagulation bath 10 and reeling wheel 12 are connected in order. The coagulation bath 10 is equipped with a guiding wheel 11. The extruder 1 is equipped with a feeding hopper 2. The fiber spinning mold 4 is equipped with a nitrogen gas tank 5.

During operation of the apparatus, the homogeneous and fine powder-like mixture of the thermoplastic macromolecule polymer resin, organic pore-forming agents, inorganic pore-forming agents and auxiliary agents mixed in advance in a high speed mixer, is fed with the feeding hopper 2 into the extruder 1, extruded in a high temperature, passes through the melt pump 3, and enters the fiber spinning mold 4 with nitrogen gas (N2) from the nitrogen gas tank 5 to obtain a fresh uncured hollow fiber. The fresh uncured hollow fiber moves directly into the coating polymeric dope solution coating device 7 with adjustable distances controlled by the adjustable fixed part 6. The coating polymeric dope solution coating device 7 is equipped with the coating polymeric dope solution tank 8 and the coating polymeric dope solution delivering pump 9 by which the coating polymeric dope solution is continuously delivered to the coating device 7. The coating polymeric dope solution comprises the same thermoplastic macromolecule polymer resin as used in the mixture, macromolecule pore-forming agents, surfactants, good solvents and poor solvents, which are mixed, agitated and degassed in the coating polymeric dope solution tank 8. When the fresh uncured hollow fiber passes through the coating polymeric dope solution coating device 7, the thickness of the coated layer is controlled by the different formulas of the coating polymeric dope solutions and the passing-through speeds. Meanwhile, the fresh uncured hollow fiber is completely solidified and coated on its surface in the coating polymeric dope solution. After passing through the coating polymeric dope solution coating device 7, the composite multilayer hollow fiber is introduced into the coagulation bath 10 where the outer coating layer is coagulated. Through the guiding wheel 11, the composite multilayer hollow fiber is wound in the reeling wheel 12. After the composite multilayer hollow fiber produced is stretched, it is treated with the organic extraction and the inorganic abstraction, soaked in an ethanol solution, finally submerged in the pure water for being washed for several times, soaked in 50% glycerin solution for two days and dried at 50° C. The final product of the composite multilayer porous hollow fiber membrane is prepared.

Embodiment 3

Polyvinylidene fluoride homopolymer was the thermoplastic macromolecule polymer resin, being used not only for producing the inner porous supporting layer with larger pore sizes of the composite multilayer hollow fiber membrane by the thermal induced phase separation (TIPS) technique, but also for coating to form the outer layer with microfiltration/ultrafiltration functions by the non-solvent induced phase separation (NIPS) technique. The melted mixture (a) used for producing the inner supporting layer of the composite multilayer porous hollow fiber membrane by the thermal induced phase separation (TIPS) technique, was composed by weight of 25% activated nano zinc oxide (particle diameters about 30-50 nm), 40% polyvinylidene fluoride (PVDF) resin (molecular weight: 250,000-400,000 Dalton), 33.8% dioctyl phthalate, and 1.2% dibutyl phthalate, which were mixed at room temperature in a high-speed mixer to make a solid mixture in which the solid materials were homogeneously dispersed in the organic phase. The homogeneously dispersed solid mixture (powder-like) was ready for use. The macromolecule polymeric dope solution (b) used for producing the functional outer layer by the non-solvent induced phase separation (NIPS) technique, was composed by weight of 20% polyvinylidene fluoride (PVDF) resin (molecular weight: 400,000-600,000 Dalton), 2% polyvinyl pyrrolidone (PVP), 8.4% polyethylene glycol-400 (PEG-400), 2.1% Tween-80 and 67.5% dimethylacetamide (DMAc), which were agitated and mixed under nitrogen gas atmosphere at the temperature of 130° C. to form a homogeneous polymeric dope solution. The homogeneous polymeric dope solution (b) was static for degassing at the temperature of 130° C. for one day and then ready for use.

The thermal induced phase separation (TIPS) technique used a twin-screw extruder (screw diameter: 20; screw length: screw diameter=40:1). Maintaining the barrel temperature at 230° C., the homogeneously dispersed solid powder-like mixture (a) was fed into the extruder, melted and kneaded in the extruder, extruded into a spinning nozzle that was attached to the tip of the extruder, having temperature of 250° C. through a co-axial tube-in-orifice spinning circular ring nozzle having a size of inner diameter of outside nozzle/outer diameter of inside nozzle=$\phi$1.9 mm/$\phi$0.9 mm/$\phi$0.6 mm while supplying air into the hollow portion at flow rate of 18 ml/min. The uncured hollow fiber extruded from the spinning circular ring nozzle at a spinning speed of 40 g/min, directly passed through the coating device of the non-solvent induced phase separation (NIPS) technique. The spinning nozzle of the twin-screw extruder for the thermal induced phase separation (TIPS) technique was directly connected via a heat insulated layer with the coating device for the non-solvent induced phase separation (NIPS) technique (the gap is zero; it means that the hollow fiber produced by the thermal induced phase separation (TIPS) technique had no contact with air before entering the coating device for the non-solvent induced phase separation (NIPS) technique). The coating device of the non-solvent induced phase separation (NIPS) technique was kept at 130° C. The fresh uncured hollow fiber extruded from the thermal induced phase separation (TIPS) technique at a spinning speed of 20 m/min traveled 5 cm and entered into the coating device with a sealed spinning nozzle of ($\phi$2.2 mm) for the non-solvent induced phase separation (NIPS) technique. The coating polymeric dope solution (b) in the tank was injected to the coating device at 2 ml/min to maintain the height level of the coating polymeric dope solution, ensuring the homogeneity of the thickness of the coated layer. After the uncured hollow fiber extruded from the spinning nozzle of the extruder by the TIPS technique was solidified and at the same time coated with an even-thickness ultra thin layer in the coating device of the NIPS technique, it was introduced to the 2 m-long coagulation bath at 50° C. after travelling an air gap of 2 cm, where the water solution containing 30% by weight of dimethylacetamide (DMAc) was used as the coagulation solution, so that the functional outer surface coated layer was coagulated. The composite multilayer hollow fiber was wound up by the reel about 3.5 m in peripheral length and continuously rinsed with pure water. Before the composite multilayer hollow fibers taken off from a reel were extracted and abstracted, they were drawn up to 30% elongation in a water bath at 50° C. After that, the drawn composite multilayer hollow fibers were soaked in 95% ethanol solution at 40° C. with mechanical vibration to extract organic pore-forming agents and solvents for 0.5 hour; the extraction was repeated 3 times. Then, they were rinsed with pure water and dipped in 2M sulfuric acid solution at room temperature with mechanical vibration once for 0.5 hour to remove inorganic pore-forming agents. Finally, the formed composite multilayer porous fiber membrane were rinsed and dipped with pure water at room temperature for 0.5 hour and repeated 3 times, then soaked in 50% glycerin water solution for 2 days, and dried in the atmosphere at 50° C. The amount of the residual zinc (Zn) remaining in the resultant composite multilayer porous hollow fiber membranes was less than 0.3% by weight.

The resultant composite multilayer porous hollow fiber membrane had the outer diameter of 1.24 mm, the inner diameter of 0.65 mm, a porosity of 77%, the average thickness of 0.02 mm for the functional outer surface composite coating layer, the average pore sizes of 0.05 μm on the functional outer surface of the membranes, the average pore sizes of 0.8 μm on the supporting inner surface of the membranes, the pure water permeation rate of 1,950 L/m2 hr@0.1M Pa, 25° C., the tensile break strength of 12 MPa, the tensile break elongation of 160%, and the anti-compression strength of >0.8 MPa. After soaked in the solution of 2% sodium hydroxide and 5000 ppm sodium hypochlorite for consecutive 30 days, there was no change of the tensile break strength of the membrane fiber and its tensile break elongation was maintained to be 97-98% of its original tensile break elongation before soaking. It showed it has excellent high alkaline resistance and oxidization resistance.

Figure 3:
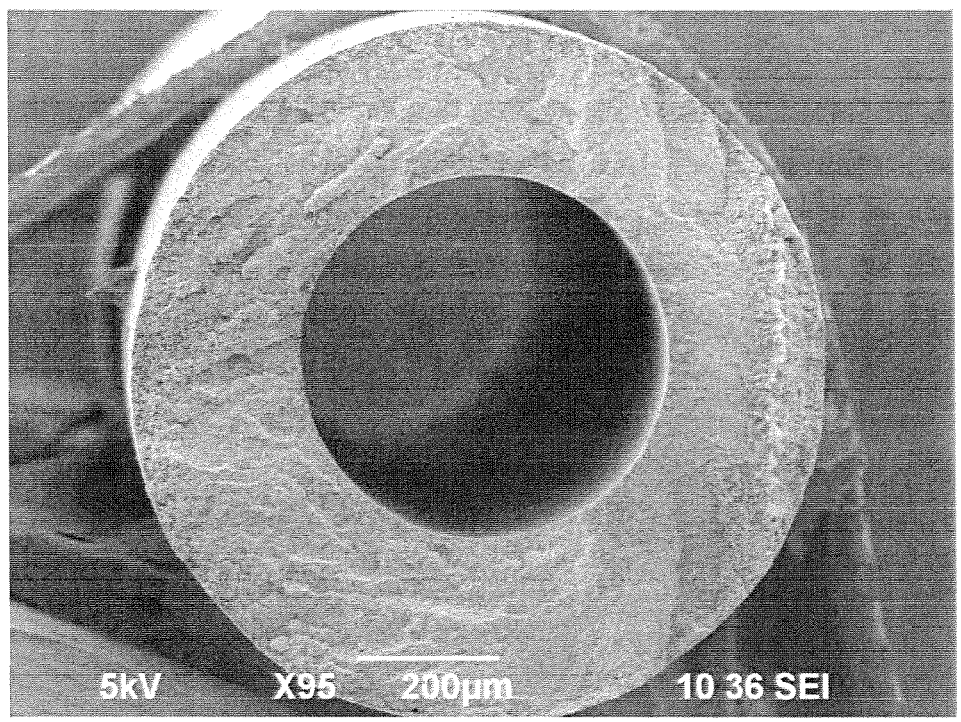
FIG. 3 shows a scanning electron micrograph of a cross section of a composite multilayer porous hollow fiber membrane made in the first preferred embodiment of the present invention.
Figure 4:
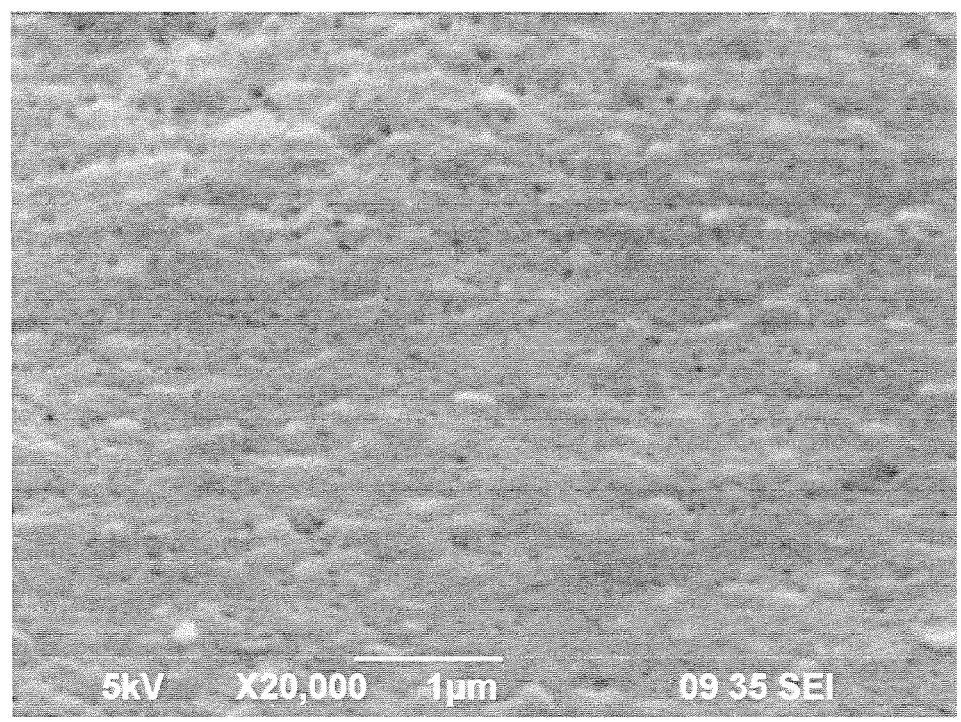
FIG. 4 shows a scanning electron micrograph of the outer surface of an outer coating layer of the composite multilayer porous hollow fiber membrane shown in FIG. 3.
Figure 5:
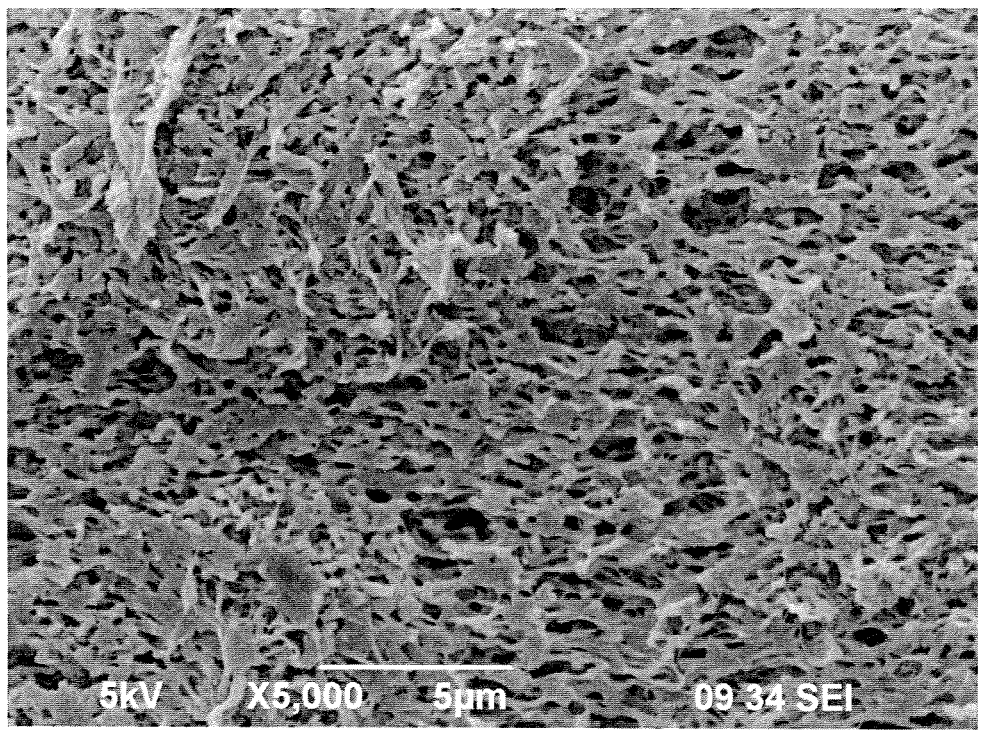
FIG. 5 shows a scanning electron micrograph of the inner surface of the inner supporting layer of the composite multilayer porous hollow fiber membrane shown in FIG. 3.

A scanning electron micrograph of the resultant PVDF composite multilayer porous hollow fiber membrane is shown in FIG. 3. FIG. 3 is the radial cross-section of the PVDF composite multilayer porous hollow fiber membrane, showing that the density of sponge-like structure pores is increased with the gradient from the inner surface to the outer surface, and there is no clear interface between the functional outer coating layer and the inner supporting layer. Thereby, there was no observation of peeling-off between the two layers, and the two layers integrated completely together. As shown in FIG. 4, the surface of the outer coated layer showed the typical ultra fine pore size structure made by the NIPS technique. As shown in FIG. 5, the inner surface of the inner supporting layer showed the typical sturdy structure with large pore sizes made by the TIPS technique.

Embodiment 4

The formula used in the present embodiment was as follows. The melted and kneaded mixture (a) used for producing the inner supporting layer of the composite multilayer porous hollow fiber membrane by the thermal induced phase separation (TIPS) technique, was comprised of 30 parts by weight of poly(vinylidene fluoride-hexafluoropropylene), 20 parts by weight of dipentyl phthalate, 10 parts by weight of active nano zinc oxide. The coating polymeric dope solution (b) used for producing the functional outer layer by the non-solvent induced phase separation (NIPS) technique, was comprised of 5 parts by weight of the poly(vinylidene fluoride-hexafluoropropylene), 1 part by weight of polyvinylpyrrolidone (PVP), 1 part by weight of Tween-80, 40 parts by weight of dimethyl formamide (DMF), 1 part by weight of glycerol. Preparation method and process conditions were the same as that in the Embodiment 3, except that the outer coagulation bath was pure water at 50° C. The zinc residue in the resultant composite multilayer porous hollow fiber membrane was less than 0.3%.

The resultant composite multilayer porous PVDF hollow fiber membrane had the outer diameter of 1.24 mm, the inner diameter of 0.66 mm, the porosity 79.5%, the average thickness of 0.018 mm for the functional outer layer, the average pore sizes of 0.065 μm for functional outer surface of the membrane, the average pore sizes of 0.82 μm for the inner surface of the supporting layer, the pure water flux of 2,015 L/m2 hr@0.1 mPa, 25° C., the tensile break strength of 12.2 mPa, the tensile break elongation of 155.6%, the membrane anti-compression strength>0.8 mPa.

Figure 6:
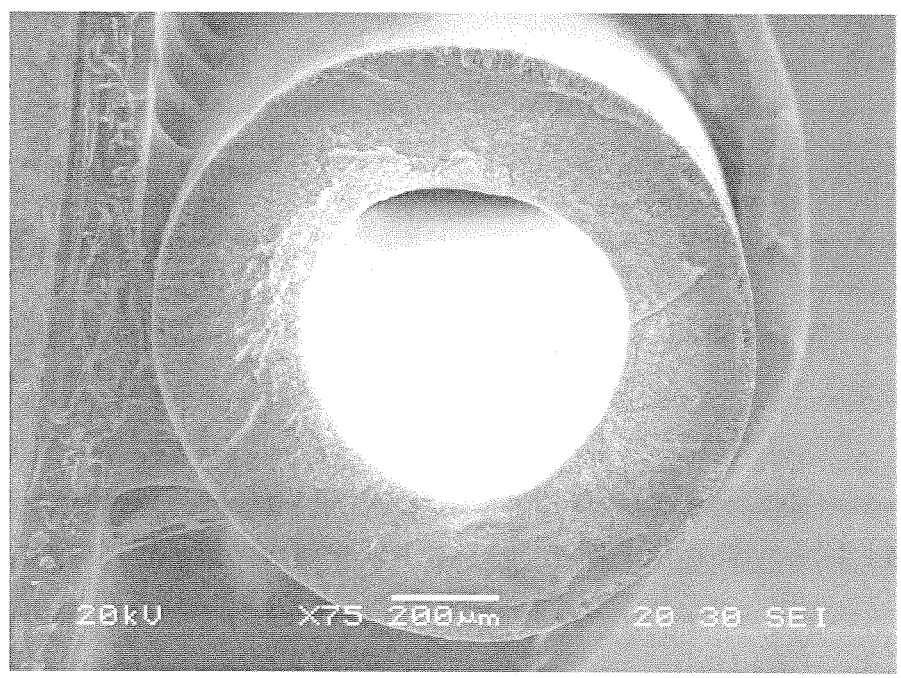
FIG. 6 shows a scanning electron micrograph of a cross section of a composite multilayer porous hollow fiber membrane made in the second preferred embodiment of the present invention.

The scanning electron micrograph of the resultant composite PVDF multilayer porous hollow fiber membrane is shown in FIG. 6. As shown in FIG. 6, the radial cross section of the composite PVDF multilayer porous hollow fiber membrane showed that the outer layer had a very thin finger-like layer, but there was no clear interface between the functional outer coating layer and the inner supporting layer.

Embodiment 5

The formula used in the present embodiment was as follows. The melted and kneaded mixture (a) used for producing the inner supporting layer of the composite multilayer porous hollow fiber membrane by the thermal induced phase separation (TIPS) technique, was comprised of 50 parts by weight of poly(vinylidene fluoride-chlorotrifluoroethylene), 40 parts by weight of methyl benzoate, 30 parts by weight of active nano calcium carbonate and 5 parts by weight of antioxidants. The macromolecule polymeric dope solution (b) used for producing the functional outer layer by the non-solvent induced phase separation (NIPS) technique, was comprised of 30 parts by weight of poly(vinylidene fluoride-chlorotrifluoroethylene), 20 parts by weight of polyethylene glycol (PEG), 20 parts by weight of the mixture of Tween-80, sodium dodecyl sulfate, and sodium dodecyl benzene sulfonate, 90 parts by weight of dimethylacetamide (DMAc), 10 parts by weight of glycol. Preparation method and process conditions were the same as that in the Embodiment 3, except that the composite multilayer hollow fiber membrane taken off the reel was not drawn prior to extraction and abstraction. The zinc residue in the resultant composite multilayer porous hollow fiber membrane was less than 0.3%.

The resultant composite multilayer porous PVDF hollow fiber membrane had the outer diameter of 1.28 mm, the inner diameter of 0.70 mm, the porosity 71.3%, the average thickness of 0.023 mm for the functional outer layer, the average pore sizes of 0.01 μm for functional outer surface of the membrane, the average pore sizes of 0.45 μm for the inner surface of the supporting layer, the pure water flux of 1,360 L/m2 hr@0.1 mPa, 25° C., the tensile break strength of 9.3 mPa, the tensile break elongation of 240%, the membrane anti-compression strength>0.8 mPa.

Embodiment 6

The formula used in the present embodiment was as follows. The melted and kneaded mixture (a) used for producing the inner supporting layer of the composite multilayer porous hollow fiber membrane by the thermal induced phase separation (TIPS) technique, was comprised of 40 parts by weight of poly(vinylidene fluoride-ethylene), 30 parts by weight of dimethyl sebacate, 20 parts by weight of active nano silicon dioxide and 3 parts by weight of lubricant. The macromolecule polymeric dope solution (b) used for producing the functional outer layer by the non-solvent induced phase separation (NIPS) technique, was comprised of 20 parts by weight of poly(vinylidene fluoride-ethylene), 10 parts by weight of methyl cellulose, 10 parts by weight of the mixture of Tween-80, sodium dodecyl sulfate, 60 parts by weight of N-methyl pyrrolidone (NMP), 5 parts by weight of butanediol. Preparation method and process conditions were the same as that in the Embodiment 3, except that the uncured PVDF inner supporting layer of the hollow fiber produced by the thermal induced phase separation (TIPS) technique traveled 1 cm in the air and then entered into the PVDF coating device in the non-solvent induced phase separation (NIPS) technique. The zinc residue in the resultant composite multilayer porous hollow fiber membrane was less than 0.3%.

The resultant composite multilayer porous PVDF hollow fiber membrane had the outer diameter of 1.25 mm, the inner diameter of 0.66 mm, the porosity 79.3%, the average thickness of 0.025 mm for the functional outer layer, the average pore sizes of 0.06 μm for functional outer surface of the membrane, the average pore sizes of 0.85 μm for the inner surface of the supporting layer, the pure water flux of 1,980 L/m2 hr@0.1 mPa, 25° C., the tensile break strength of 11.8 mPa, the tensile break elongation of 148%, the membrane anti-compression strength>0.8 mPa.

Figure 7:
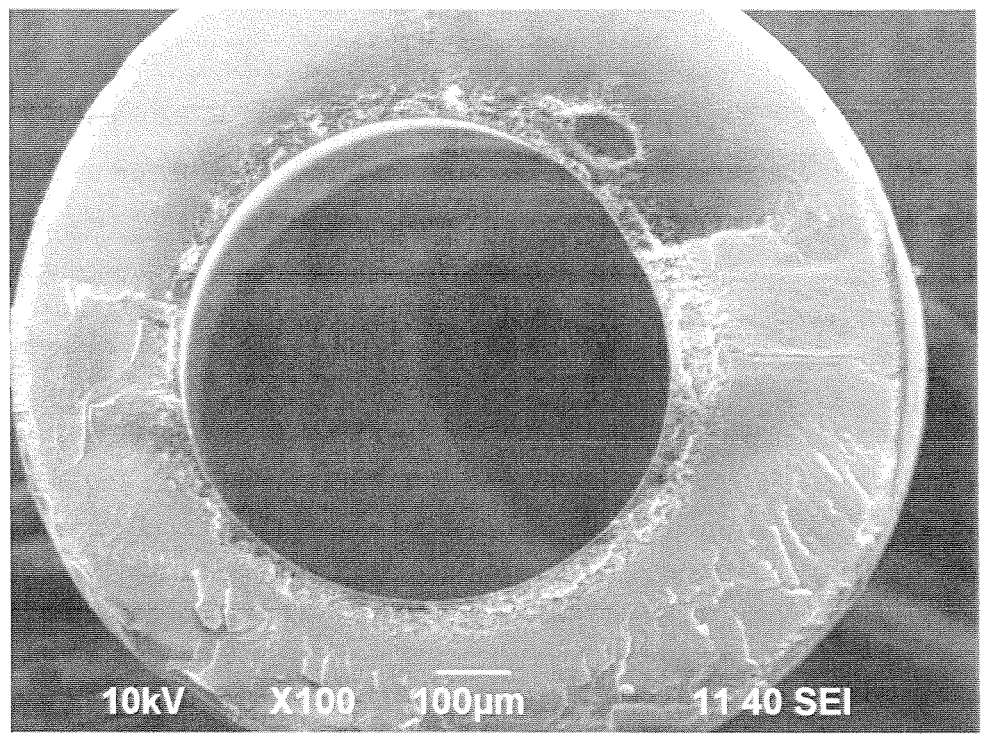
FIG. 7 shows a scanning electron micrograph of a cross section of a composite multilayer porous hollow fiber membrane made in the fourth preferred embodiment of the present invention.

The scanning electron micrograph of the resultant composite PVDF multilayer porous hollow fiber membrane is shown in FIG. 7. As shown in FIG. 7, the radial cross section of the composite PVDF multilayer porous hollow fiber membrane showed that there was discernible interface between the functional outer coating layer and the inner supporting layer. This is because, prior to entering into the polymeric dope solution coating device in the non-solvent induced phase separation (NIPS) technique, the uncured PVDF inner supporting layer hollow fiber produced by the thermal induced phase separation (TIPS) technique was partially solidified in the 1 cm air gap.

Embodiment 7

The formula used in the present embodiment was as follows. The melted and kneaded mixture (a) used for producing the inner supporting layer of the composite multilayer porous hollow fiber membrane by the thermal induced phase separation (TIPS) technique, was comprised of 30 parts by weight of polysulfone, 20 parts by weight of dimethyl adipate, 10 parts by weight of active organic clay. The macromolecule polymeric dope solution (b) used for producing the functional outer layer by the non-solvent induced phase separation (NIPS) technique, was comprised of 25 pads by weight of active zinc oxide (particle sizes about 30-50 nm), 40 parts by weight of polyvinylidene fluoride (PVDF, MW: 250,000-400,000 Dalton), 35 parts by weight of dioctyl phthalate. Preparation method and process conditions were the same as that in the Embodiment 3. The zinc residue in the resultant composite multilayer porous hollow fiber membrane was less than 0.3%.

The resultant composite multilayer porous PVDF hollow fiber membrane had the outer diameter of 1.26 mm, the inner diameter of 0.65 mm, the porosity 82.3%, the average thickness of 0.02 mm for the functional outer layer, the average pore sizes of 0.055 μm for functional outer surface of the membrane, the average pore sizes of 1.25 μm for the inner surface of the supporting layer, the pure water flux of 2,460 L/m2 hr@0.1 mPa, 25° C., the tensile break strength of 10.3 mPa, the tensile break elongation of 162%, the membrane anti-compression strength>0.8 mPa.

Embodiment 8

The formula used in the present embodiment was as follows. The melted and kneaded mixture (a) used for producing the inner supporting layer of the composite multilayer porous hollow fiber membrane by the thermal induced phase separation (TIPS) technique, was comprised of 50 parts by weight of polyether sulfone, 40 parts by weight of trimellitic acid trioctyl, 30 parts by weight of active diatomite and 5 parts by weight of anti-adhesion agent. The macromolecule polymeric dope solution (b) used for producing the functional outer layer by the non-solvent induced phase separation (NIPS) technique, was comprised of 30 parts by weight of polyether sulfone, 20 parts by weight of polyvinyl alcohol, 20 parts by weight of cetyl trimethyl ammonium bromide, 90 parts by weight of methyl ethyl ketone, 10 parts by weight of methanol. Preparation method and process conditions were the same as that in the Embodiment 3, except that the newly made uncured hollow fiber produced by the thermal induced phase separation (TIPS) technique entered at the speed of 10 m/min into the PVDF coating device in the non-solvent induced phase separation (NIPS) technique; after coating, introduced into the coagulation bath. The zinc residue in the resultant composite multilayer porous hollow fiber membrane was less than 0.3%.

The resultant composite multilayer porous hollow fiber membrane had the outer diameter of 1.25 mm, the inner diameter of 066 mm, the porosity 78.5%, the average thickness of 0.05 mm for the functional outer layer, the average pore sizes of 0.062 μm for functional outer surface of the membrane, the average pore sizes of 0.85 μm for the inner surface of the supporting layer, the pure water flux of 1,720 L/m2 hr@0.1 mPa, 25° C., the tensile break strength of 11.5 mPa, the tensile break elongation of 145%, the membrane anti-compression strength>0.8 mPa.

Embodiment 9

The formula used in the present embodiment was as follows. The melted and kneaded mixture (a) used for producing the inner supporting layer of the composite multilayer porous hollow fiber membrane by the thermal induced phase separation (TIPS) technique, was comprised of 40 parts by weight of ethylene-vinyl alcohol copolymer, 30 parts by weight of tributyl phosphate, 20 parts by weight of active kaolinite and 3 parts by weight of heat stabilizer. The macromolecule polymeric dope solution (b) used for producing the functional outer layer by the non-solvent induced phase separation (NIPS) technique, was comprised of 18.5 parts by weight of polyvinylidene fluoride (PVDF molecular weight of 400,000-600,000 Dalton), 10.5 parts by weight of polyethylene glycol-400 (PEG-400), 2.5 parts by weight of Tween-80 (T-80), 68.5 parts by weight of dimethyl amide (DMAc). The coagulation solution was comprised of 20 parts by weight of PEG-400 (PEG-400) and 80 parts by weight of water. Preparation method and process conditions were the same as that in the Embodiment 3. The zinc residue in the resultant composite multilayer porous hollow fiber membrane was less than 0.3%.

The resultant composite multilayer porous hollow fiber membrane had the outer diameter of 1.26 mm, the inner diameter of 0.67 mm, the porosity 74.5%, the average pore sizes of 0.043 μm for functional outer surface of the membrane, the average pore sizes of 0.86 μm for the inner surface of the supporting layer, the pure water flux of 1,320 L/m2 hr@0.1 mPa, 25° C., the tensile break strength of 12.2 mPa, the tensile break elongation of 162%, the membrane anti-compression strength>0.8 mPa.

Embodiment 10

The formula used in the present embodiment was as follows. The melted and kneaded mixture (a) used for producing the inner supporting layer of the composite multilayer porous hollow fiber membrane by the thermal induced phase separation (TIPS) technique, was comprised of 30 parts by weight of poly(vinylidene fluoride-hexafluoropropylene), 20 parts by weight of the mixture of trimellitic acid trioctyl and tributyl phosphate, 10 parts by weight of the mixture of active nano zinc oxide, active nano calcium carbonate, active nano silicon dioxide. The macromolecule polymeric dope solution (b) used for producing the functional outer layer by the non-solvent induced phase separation (NIPS) technique, was comprised of 20 parts by weight of polyvinylidene fluoride (PVDF, molecular weight 400,000-600,000 Dalton), 80 parts by weight of 1-butyrolactone. The coagulation bath was comprised of 40 parts by weight of dimethyl amide (DMAc) and 60 parts by weight of ethylene glycol. Preparation method and process conditions were the same as that in the Embodiment 3. The zinc residue in the resultant composite multilayer porous hollow fiber membrane was less than 0.3%.

The resultant composite multilayer porous hollow fiber membrane had the outer diameter of 1.25 mm, the inner diameter of 0.65 mm, the porosity 79.4%, the average pore sizes of 0.08 μm for functional outer surface of the membrane, the average pore sizes of 0.78 μm for the inner surface of the supporting layer, the pure water flux of 2,280 L/m2 hr@0.1 mPa, 25° C., the tensile break strength of 14.1 mPa, the tensile break elongation of 158%, the membrane anti-compression strength>0.8 mPa.

Embodiment 11

The melted and kneaded mixture (a) used for producing the inner supporting layer of the composite multilayer porous hollow fiber membrane by the thermal induced phase separation (TIPS) technique was comprised of 27 parts by weight of activated nano calcium carbonate (average particle diameter: <40 nm), 37.5 parts by weight of polyvinylidene fluoride (PVDF, molecular weight: 250,000-400,000 Dalton), 33.8 parts by weight of dioctyl phthalate, 1.7 parts by weight of dibutyl phthalate, which were mixed with high speed in a high-speed mixer to make a solid mixture in which the solid materials were homogeneously dispersed in the organic phase. The homogeneously dispersed solid mixture (powder-like) was ready for use. The macromolecule polymeric dope solution (b) used for producing the functional outer surface coated layer of the composite multilayer porous hollow fiber membrane by the non-solvent induced phase separation (NIPS) technique was comprised of 20 parts by weight of polyvinylidene fluoride (PVDF, molecular weight: 400,000-600,000 Dalton), 2.2 parts by weight of polyvinyl pyrrolidone (PVP), 10.3 parts by weight of polyethylene glycol-400 (PEG-400), and 67.5 parts by weight of dimethylacetamide (DMAc), which were agitated and mixed under nitrogen gas atmosphere at 130° C. to form a homogeneous liquid dope. The homogeneous liquid dope (b) was static for degassing at 130° C. for one day and then was ready for use.

A twin-screw extruder (screw diameter: 20; screw length: screw diameter=40:1) was used in the thermal induced phase separation (TIPS) technique. The homogeneously dispersed solid mixture (a) (powder-like) was fed into an extruder having a barrel temperature of 240° C. After resulting mixture (a) (powder-like) was melted and kneaded in the extruder, it was extruded into a spinning nozzle, which was attached to the tip of the extruder, having temperature of 260° C. through a co-axial tube-in-orifice spinning circular ring nozzle having a size of inner diameter of outside nozzle/outer diameter of inside nozzle=φ1.9 mm/φ0.9 mm/φ0.6 mm while supplying air into the hollow portion at flow rate of 17.4 ml/min. The uncured hollow fiber extruded from the spinning circular ring nozzle at spinning speed of 40 g/min, was directly moved to a coating device. The spinning nozzle of the twin-screw extruder for the thermal induced phase separation (TIPS) technique was directly connected via a heat insulated layer with the coating device for the non-solvent induced phase separation (NIPS) technique (the gap is zero; it means that the hollow fiber produced by the thermal induced phase separation (TIPS) technique had no contact with air before entering the coating device for the non-solvent induced phase separation (NIPS) technique). The coating device of the non-solvent induced phase separation (NIPS) technique was kept at 130° C. The fresh uncured hollow fiber extruded from the thermal induced phase separation (TIPS) technique at a speed of 20 m/min entered into the coating device of the NIPS technique and passed through the sealed spinning nozzle of ($\phi$2.2 mm) for the non-solvent induced phase separation (NIPS) technique. The coating liquid dope (b) in the tank was injected to the coating device at 2 ml/min to maintain the height level of the coating liquid dope, ensuring the homogeneity of the thickness of the coated layer. After the uncured hollow fiber extruded from the spinning nozzle of the extruder by the TIPS technique was solidified and at the same time coated with an even-thickness ultra thin layer in the coating device of the NIPS technique, it was introduced to the 2 m-long coagulation bath at 50° C. after travelling an air gap of 2 cm, where the water solution containing 30% by weight of dimethylacetamide (DMAc) was used as the coagulation solution, so that the functional outer surface coated layer was coagulated. The composite multilayer hollow fiber was wound up by the reel about 3.5 m in peripheral length and continuously rinsed with pure water. Before the composite multilayer hollow fibers taken off from a reel were extracted and abstracted, they were drawn up to 30% elongation in a water bath at 50° C. After that, the drawn composite multilayer hollow fibers were soaked in 95% ethanol solution at 40° C. with mechanical vibration to extract organic pore-forming agents and solvents for 0.5 hour; the extraction was repeated 3 times. Then, they were rinsed with pure water and dipped in 2M sulfuric acid solution at room temperature with mechanical vibration once for 0.5 hour to remove inorganic pore-forming agents. Finally, the formed composite multilayer porous fiber membrane were rinsed and dipped with pure water at room temperature for 0.5 hour and repeated 3 times, then soaked in 50% glycerin water solution for 2 days, and dried in the atmosphere at 50° C. The amount of the residual calcium (Ca) remaining in the resultant composite multilayer porous hollow fiber membranes was less than 0.3% by weight.

The resultant composite multilayer porous hollow fiber membrane had the outer diameter of 1.25 mm, the inner diameter of 0.68 mm, the porosity of 80.2%, the average thickness of 0.03 mm for the functional outer surface composite coating layer, the average pore sizes of 0.06 μm on the functional outer surface of the membranes, the average pore sizes of 0.75 μm on the supporting inner surface of the membranes, the pure water permeation rate of 1,825 L/m2 hr@0.1 M Pa, 25° C., the tensile break strength of 14.7 MPa, the tensile break elongation of 182%, and the anti-compression strength of >0.8 MPa. After soaked in the solution of 2% sodium hydroxide and 5000 ppm sodium hypochlorite for consecutive 30 days, there was no change of the tensile break strength of the membrane fiber and its tensile break elongation was maintained to be 97-98% of its original tensile break elongation before soaking. It showed it has excellent high alkaline resistance and oxidization resistance.

Figure 8:
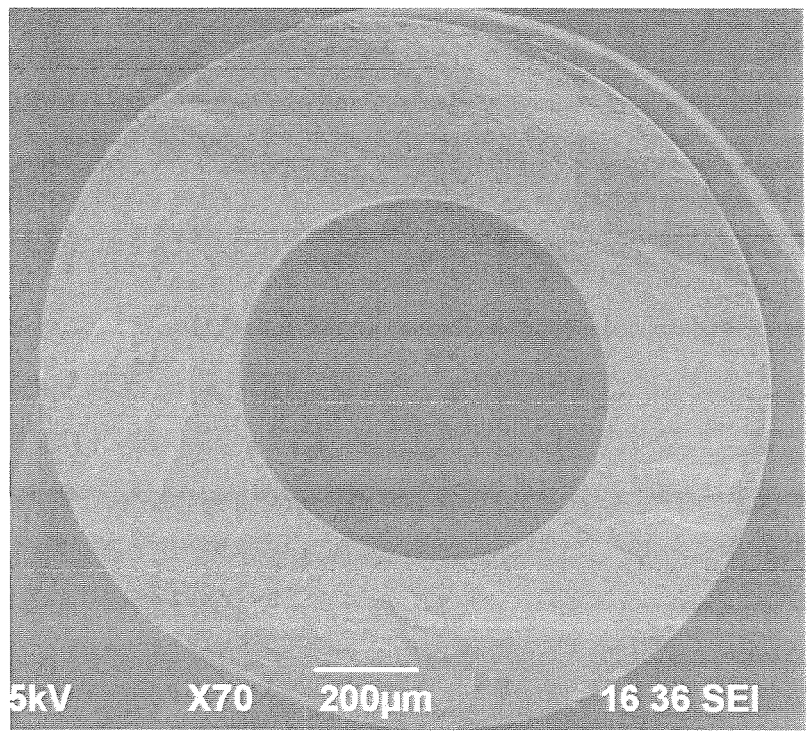
FIG. 8 shows a scanning electron micrograph of a cross section of a composite multilayer porous hollow fiber membrane made in the ninth preferred embodiment of the present invention.
Figure 9:
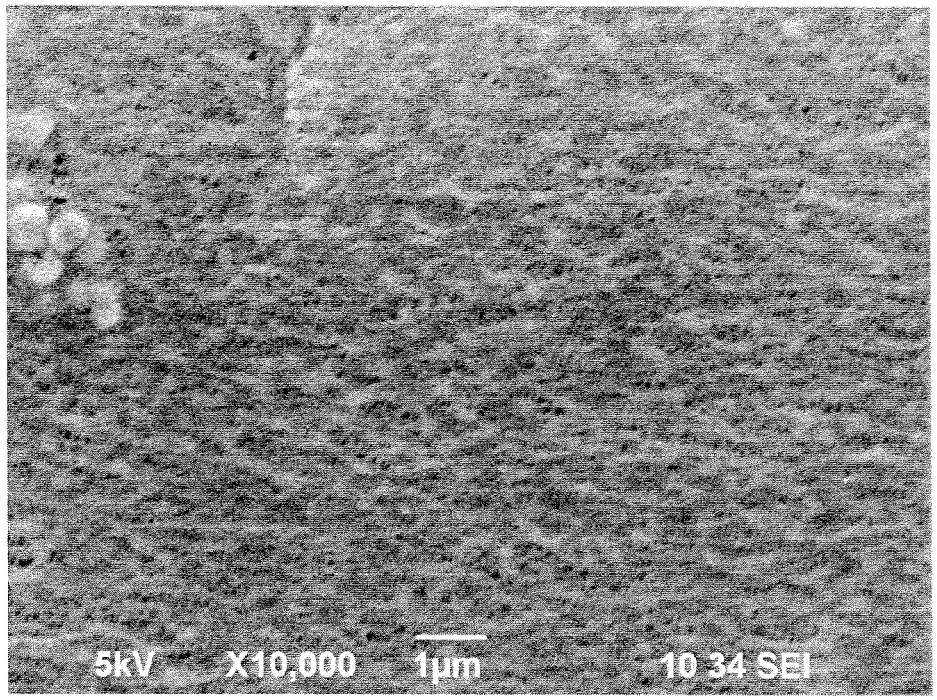
FIG. 9 shows a scanning electron micrograph of the outer surface of the outer coating layer of the composite multilayer porous hollow fiber membrane shown in FIG. 8.
Figure 10:
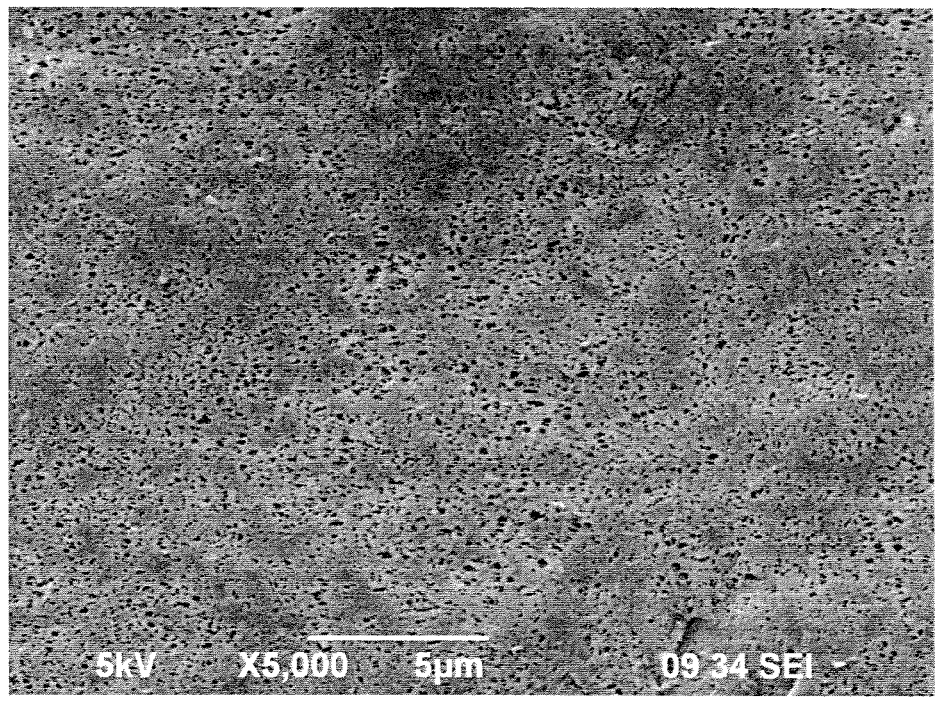
FIG. 10 shows a scanning electron micrograph of the inner surface of the inner supporting layer of the composite multilayer porous hollow fiber membrane shown in FIG. 8.

A scanning electron micrograph of the resultant PVDF composite multilayer porous hollow fiber membrane is shown in FIG. 8. FIG. 8 is the radial cross-section showing that the density of sponge-like structure pores is increased with the gradient from the inner surface to the outer surface, and there is no clear interface between the functional outer coating layer and the inner supporting layer. Thereby, there was no observation of peeling-off between the two layers, and the two layers integrated completely together. As shown in FIG. 9, the surface of the outer coated layer showed the typical ultra fine pore size structure made by the NIPS technique. As shown in FIG. 10, the inner surface of the inner supporting layer showed the typical sturdy structure with large pore sizes made by the TIPS technique.

Embodiment 12

The formula used in the present embodiment was as follows. The melted and kneaded mixture (a) used for producing the inner supporting layer of the composite multilayer porous hollow fiber membrane by the thermal induced phase separation (TIPS) technique, was comprised of 27 parts by weight of activated nano calcium carbonate (average particle diameter: <40 nm), 37.5 parts by weight of polyvinylidene fluoride (PVDF, molecular weight: 250,000-400,000 Dalton), 34.7 parts by weight of dioctyl phthalate (DOP), and 0.8 parts by weight of dibutyl phthalate (DBP). The macromolecule polymeric dope solution (b) used for producing the functional outer layer by the non-solvent induced phase separation (NIPS) technique, was comprised of 30 parts by weight of poly(vinylidene fluoride-hexafluoropropylene), 20 parts by weight of the mixture of polyvinylpyrrolidone (PVP) and polyethylene glycol (PEG), 20 parts by weight of sodium dodecyl sulfate, 90 parts by weight of the mixture of methyl ethyl ketone and acetone, 10 parts by weight of a mixture of isopropyl alcohol and n-butanol. Preparation method and process conditions were the same as that in the Embodiment 9. The residual calcium (Ca) in the resultant composite multilayer porous hollow fiber membrane was less than 0.3%.

The resultant composite multilayer porous hollow fiber membrane had the outer diameter of 1.24 mm, the inner diameter of 0.66 mm, the porosity 82.5%, the average pore sizes of 0.08 μm for functional outer surface of the membrane, the average pore sizes of 0.98 μm for the inner surface of the supporting layer, the pure water flux of 2,560 L/m2 hr@0.1 mPa, 25° C., the tensile break strength of 13.3 mPa, the tensile break elongation of 126%, the membrane anti-compression strength>0.8 mPa.

Embodiment 13

The formula used in the present embodiment was as follows. The melted and kneaded mixture (a) used for producing the inner supporting layer of the composite multilayer porous hollow fiber membrane by the thermal induced phase separation (TIPS) technique, was comprised of 40 parts by weight of polyvinylidene fluoride, 30 parts by weight of trimellitic acid, trioctyl, 20 parts by weight of the mixture of activated diatomite or activated clay and 3 parts by weight of the mixture of antioxidants, lubricants, and anti-adhesion agent. The macromolecule polymeric dope solution (b) used for producing the functional outer layer by the non-solvent induced phase separation (NIPS) technique, was comprised of 18.5 parts by weight of polyvinylidene fluoride (PVDF, molecular weight: 400,000-600,000 Dalton), 13 parts by weight polyethylene glycol-400 (PEG-400), 68.5 parts by weight dimethyl diethyl amide (DMAC). The coagulation bath was comprised of 10 parts by weight of polyethylene glycol-400 (PEG-400), and 90 parts by weight of water. Preparation method and process conditions were the same as that in the Embodiment 9. The residual calcium (Ca) in the resultant composite multilayer porous hollow fiber membrane was less than 0.3%.

The resultant composite multilayer porous hollow fiber membrane had the outer diameter of 1.25 mm, the inner diameter of 0.64 mm, the porosity 78.6%, the average pore sizes of 0.032 μm for functional outer surface of the membrane, the average pore sizes of 0.82 μm for the inner surface of the supporting layer, the pure water flux of 1,360 L/m2 hr@0.1 mPa, 25° C., the tensile break strength of 14.1 mPa, the tensile break elongation of 156%, the membrane anti-compression strength>0.8 mPa.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is supported by the foregoing description.

What is claimed is:

1. A method of producing a composite multilayer porous hollow fiber membrane, comprising steps of:
   (1) mixing a thermoplastic macromolecule polymer resin, an organic pore-forming agent, an inorganic pore-forming agent, and an auxiliary agent in the ratio by weight of 30-50:20-40:10-30:0-5, extruding with melting and kneading through an extruder to obtain an uncured hollow fiber;
   (2) mixing a thermoplastic macromolecule polymer resin, a hydrophilic macromolecule pore-forming agent, a surfactant, a good solvent, and a poor solvent in the ratio by weight of 5-30:1-20:1-20:40-90:1-10 in a coating polymeric dope solution tank to obtain a coating polymeric dope solution;
   (3) passing the uncured hollow fiber obtained in said step (1) by travelling 0-5 cm into the coating polymeric dope solution obtained in said step (2) for the non-solvent phase separation (NIPS) technique, wherein, when the uncured hollow fiber obtained in said step (1) is being solidified, and its outer surface is simultaneously being coated by the coating polymeric dope solution obtained in said step (2), resulting in a hollow fiber with an ultra thin outer layer;
   (4) passing the hollow fiber with the ultra thin outer layer obtained in said step (3) through a sealing spinning nozzle of the coating device, and introducing it into a coagulation bath for coagulating coating layer to form a composite multilayer hollow fiber;
   (5) extracting to obtain the composite multilayer porous hollow fiber membrane.

2. The method of claim 1, wherein the thermoplastic macromolecule polymer resins in said steps (1) and (2) are vinylidine fluoride homopolymer and/or vinylidine fluoride copolymers.

3. The method of claim 2, wherein the thermoplastic macromolecule polymer resins are poly(vinylidene fluoride-hexafluoropropylene), poly(vinylidene fluoride-chlorotrifluoroethylene), poly(vinylidene fluoride-ethylene), polysulfone, polyether sulfone, ethylene-vinyl alcohol copolymer.

4. The method of claim 1, wherein the organic pore-forming agent in said step (1) is at least one of phthalates, γ-butyrolactone, benzoates, sebacates, adipates, trimellitates, or phosphates.

5. The method of claim 1, wherein the inorganic pore-forming agent in said step (1) is at least one of activated nano oxides and activated organic clays.

6. The method of claim 1, wherein the auxiliary agent in said step (1) is at least one of antioxidants, lubricants, anti-adhesion agents, thermal stabilizers, or ultraviolet absorbers.

7. The method of claim 1, wherein the hydrophilic macromolecule pore forming agent in said step (2) is at least one of polyvinyl pyrrolidone (PVP), polyethylene glycol (PEG), methyl cellulose (MC), caboxy methyl cellulose (CMC), polyvinyl alcohol (PVA), polyacrylic acid (PAA), polyacrylate.

* * * * *